(12) United States Patent
Padilla Heredia et al.

(10) Patent No.: US 10,906,392 B2
(45) Date of Patent: Feb. 2, 2021

(54) FUEL FILLING AND VAPOR RECOVERY SYSTEM FOR VEHICLES

(71) Applicants: Nissan North America, Inc., Franklin, TN (US); Nissan Motor Co., Ltd., Yokohama (JP)

(72) Inventors: Uriel Padilla Heredia, Toluca (MX); Toshifumi Ishibashi, Mexico City (MX); Souichi Fujiwara, Kanagawa (JP); Takayuki Fuwa, Tokyo (JP)

(73) Assignees: Nissan North America, Inc., Franklin, TN (US); Nissan Motor Co., Ltd., Yokohama (JP)

( * ) Notice: Subject to any disclaimer, the term of this patent is extended or adjusted under 35 U.S.C. 154(b) by 60 days.

(21) Appl. No.: 16/285,705

(22) Filed: Feb. 26, 2019

(65) Prior Publication Data
US 2020/0269681 A1    Aug. 27, 2020

(51) Int. Cl.
  *B60K 15/04*   (2006.01)
  *B60K 15/035*  (2006.01)
  *B01D 35/027*  (2006.01)

(52) U.S. Cl.
  CPC .......... *B60K 15/04* (2013.01); *B01D 35/027* (2013.01); *B60K 15/03504* (2013.01); *B60K 2015/03538* (2013.01)

(58) Field of Classification Search
  CPC .............. B60K 15/04; B60K 15/03504; B60K 2015/03538; B01D 35/027
  See application file for complete search history.

(56) References Cited

U.S. PATENT DOCUMENTS

| 3,802,596 A * | 4/1974 | Schmidt ........... B60K 15/03504 220/746 |
| 9,457,649 B2 | 10/2016 | Fujiwara et al. |
| 2004/0103956 A1* | 6/2004 | Crowley ................ B60K 15/04 141/286 |
| 2015/0152816 A1* | 6/2015 | Fujiwara .......... B60K 15/03504 137/587 |
| 2016/0068063 A1* | 3/2016 | Aso ........................ B60K 15/04 220/86.2 |

OTHER PUBLICATIONS

Photographs of 2018 model year Toyota Rav4 fuel tank filler, taken by Nissan, 4 pages.

* cited by examiner

*Primary Examiner* — Craig M Schneider
*Assistant Examiner* — Jason N Niesz
(74) *Attorney, Agent, or Firm* — Young Basile Hanlon & MacFarlane, P.C.

(57) ABSTRACT

A fuel filling and vapor recovery system for a vehicle is described. The system includes: a canister that is in communication with a fuel receptacle in the vehicle to collect and filter fuel vapor; a first tube that is connected to the canister; a second tube that is connected to the fuel receptacle; and a canister box that is configured for connection to the first and second tubes. The canister box includes an upper member, and a lower member that is configured for engagement with the upper member such that a watertight seal is formed therebetween to prevent external water intrusion into the canister box. The lower member includes an integral connector that is configured for connection to the first tube to allow the fuel vapor to enter the canister box.

20 Claims, 7 Drawing Sheets

FUEL FILLING AND VAPOR RECOVERY SYSTEM FOR VEHICLES

TECHNICAL FIELD

The present disclosure generally relates to a fuel filling and vapor recovery system for vehicles, and, more specifically, to a watertight canister box with an integral connector.

BACKGROUND

During vehicle operation and refueling, fuel vapor is displaced within the vehicle (e.g., within the vehicle's fuel tank). This fuel vapor includes hydrocarbons, and must be filtered before being released into the ambient. Oftentimes, this filtration is performed by the vehicle's fuel vapor recovery system, which typically includes a canister that collects and filters the fuel vapor through a filtration medium (e.g., charcoal, active carbon, etc.). After filtration, the fuel vapor can be released into the ambient through a canister box that is positioned generally adjacent to the fuel inlet (e.g., the fuel filler cap).

Known systems are sometimes susceptible to external water intrusion (e.g., from tire splash, travel through wet or flooded areas, etc.), which can cause interruptions during refueling, false error codes, and other issues. To address this issue, the present disclosure describes a watertight canister box that is configured and positionable in a vehicle to reduce (if not entirely prevent) the intrusion of water (as well as foreign objects) into the system and, in particular, into the canister.

SUMMARY

In one aspect of the present disclosure, a fuel filling and vapor recovery system is described for a vehicle. The system includes: a canister that is in communication with a fuel receptacle (tank) in the vehicle to collect and filter fuel vapor from the fuel receptacle; a first tube (e.g., a hose) having a first end that is connected to the canister, and a second end that is opposite the first end; a second tube (e.g., a hose) having a first end that is connected to the fuel receptacle, and a second end that is opposite the first end; and a canister box that is configured for connection to the second ends of the first and second tubes. The canister box includes an upper member, and a lower member that is configured for engagement with the upper member such that a watertight seal is formed therebetween to prevent external water intrusion into the canister box (and the canister). The lower member includes an integral connector that is configured for connection to the first tube to allow the fuel vapor to enter the canister box.

In certain embodiments, the lower member may define a channel (e.g., an arcuate channel) that is configured to receive the upper member.

In certain embodiments, the canister box may define a first (e.g., horizontal) axis that extends between outermost lateral points on the canister box, and a second (e.g., vertical) axis that extends between uppermost and lowermost longitudinal points on the canister box in generally orthogonal relation to the first axis. In such embodiments, the connector may be positioned generally adjacent to the uppermost longitudinal point on the canister box to increase vertical separation between the connector and wheels of the vehicle (and between the connector and the ground).

In certain embodiments, the connector may be generally linear in configuration (e.g., devoid of any elbows, bends, turns, etc.) such that the fuel vapor is flowable from the first tube into the canister box along a linear path.

In certain embodiments, the canister box may further include a filter that is positioned between the upper member and the lower member. In such embodiments, the filter may be positioned adjacent to the connector to inhibit foreign items (e.g., insects, debris, etc.) from entering the first tube and/or the canister through the canister box.

In certain embodiments, the upper member and the lower member may include corresponding engagement structures to mechanically connect the upper member to the lower member. In such embodiments, the corresponding engagement structures on the upper member and the lower member may be configured for engagement in snap-fit relation.

In certain embodiments, the canister box may further include a first sealing member that is positioned between the upper member and the lower member such that a first watertight seal is formed upon connection of the upper member and the lower member.

In certain embodiments, the fuel filling and vapor recovery system may further include a cap protector that is configured for connection to the canister box.

In certain embodiments, the canister box (e.g., the upper member) may include at least one chimney that is configured to channel the fuel vapor externally.

In certain embodiments, the cap protector and the at least one chimney may include corresponding engagement structures to mechanically connect the cap protector to the canister box.

In certain embodiments, the fuel filling and vapor recovery system may further include a second sealing member that is positioned between the upper member and the cap protector such that a second watertight seal is formed upon connection of the cap protector and the upper member.

In another aspect of the present disclosure, a canister box is disclosed that is connectable to a canister in a vehicle via a canister tube (e.g., a hose) to release fuel vapor after filtration by the canister. The canister box includes a lower member with an integral connector that is configured for connection to the canister tube to allow the fuel vapor to enter the canister box; an upper member that is configured for engagement with the lower member such that a watertight seal is formed therebetween to prevent external water intrusion into the canister box (and the canister); and at least one sealing member that is positioned between the lower member and the upper member to facilitate formation of the watertight seal. The lower member and the upper member include corresponding engagement structures that are configured for mechanical connection to secure together the lower member and the upper member.

In certain embodiments, the canister box may further include a filter that is positioned between the lower member and the upper member. In such embodiments, the filter may be positioned adjacent to the connector to inhibit matter from entering the canister tube through the canister box.

In certain embodiments, the canister box may define a first axis that extends between outermost lateral points on the canister box, and a second axis that extends between uppermost and lowermost longitudinal points on the canister box. In such embodiments, the connector may be positioned generally adjacent to the uppermost longitudinal point on the canister box.

In certain embodiments, the canister box (e.g., the upper member) may include at least one chimney that is configured to channel the fuel vapor externally.

In certain embodiments, the canister box may be configured for connection to a cap protector. In such embodiments, the cap protector and the at least one chimney may include corresponding engagement structures to mechanically connect the cap protector to the upper member.

In certain embodiments, the canister box may further include at least one sealing member that is positioned between the upper member and the cap protector to facilitate formation of a watertight seal between the cap protector and the upper member upon connection of the cap protector and the upper member.

In another aspect of the present disclosure, a method of assembling a fuel filling and vapor recovery system in a vehicle is disclosed. The method includes connecting a canister box to a fuel filler tube in communication with a fuel receptacle in the vehicle; orienting the canister box such that an integral connector extending outwardly from the canister box is positioned adjacent a point of maximum elevation to increase vertical separation between the connector and wheels of the vehicle; and connecting the canister box to a canister tube in communication with a canister in the vehicle such that fuel vapor is communicated into the canister box via the canister tube after filtration by the canister.

In certain embodiments, the method may further include assembling the canister box. In such embodiments, assembling the canister box may include connecting upper and lower members such that a watertight seal is formed therebetween to prevent external water intrusion into the canister box (and the canister).

In certain embodiments, connecting the upper and lower members may include compressing at least one sealing member positioned between the upper and lower members to facilitate formation of the watertight seal.

In certain embodiments, assembling the canister box may further include positioning a filter between the upper and lower members, and adjacent to the connector, to inhibit matter from entering the canister tube through the canister box.

BRIEF DESCRIPTION OF THE DRAWINGS

According to common practice, the various features of the drawings may not be to scale, and may be arbitrarily expanded or reduced for clarity.

DETAILED DESCRIPTION

The present disclosure describes a fuel filling and vapor recovery system for vehicles that reduces (if not entirely prevents) the intrusion of water (e.g., from tire splash and/or during travel through wet or flooded areas) into the system to combat known issues associated with such intrusion, which include interruptions during refueling, false error codes, etc. The system collects and filters fuel vapor created during refueling and/or operation of the vehicle using a canister that contains a filtration medium (e.g., charcoal, active carbon, etc.) to remove hydrocarbons from the fuel vapor. The system also includes a canister box that is positioned proximate to the fuel inlet (e.g., the fuel filler cap). The canister box is connected to the vehicle's fuel receptacle (tank) via a filler tube, and to the canister via a canister tube that carries the fuel vapor into the canister box.

The canister box is a watertight structure and, accordingly, includes a series of components that are configured to facilitate sealed engagements so as to reduce (if not entirely prevent) water intrusion. To further reduce the potential for water intrusion, the canister box is configured for connection to the canister tube using an integral connector. By integrally forming the connector with the canister box, as opposed to systems in which the connector is formed as a separate, discrete component that is attached to the canister box, an interface can be eliminated, through which water may otherwise enter the system.

Figure 1:
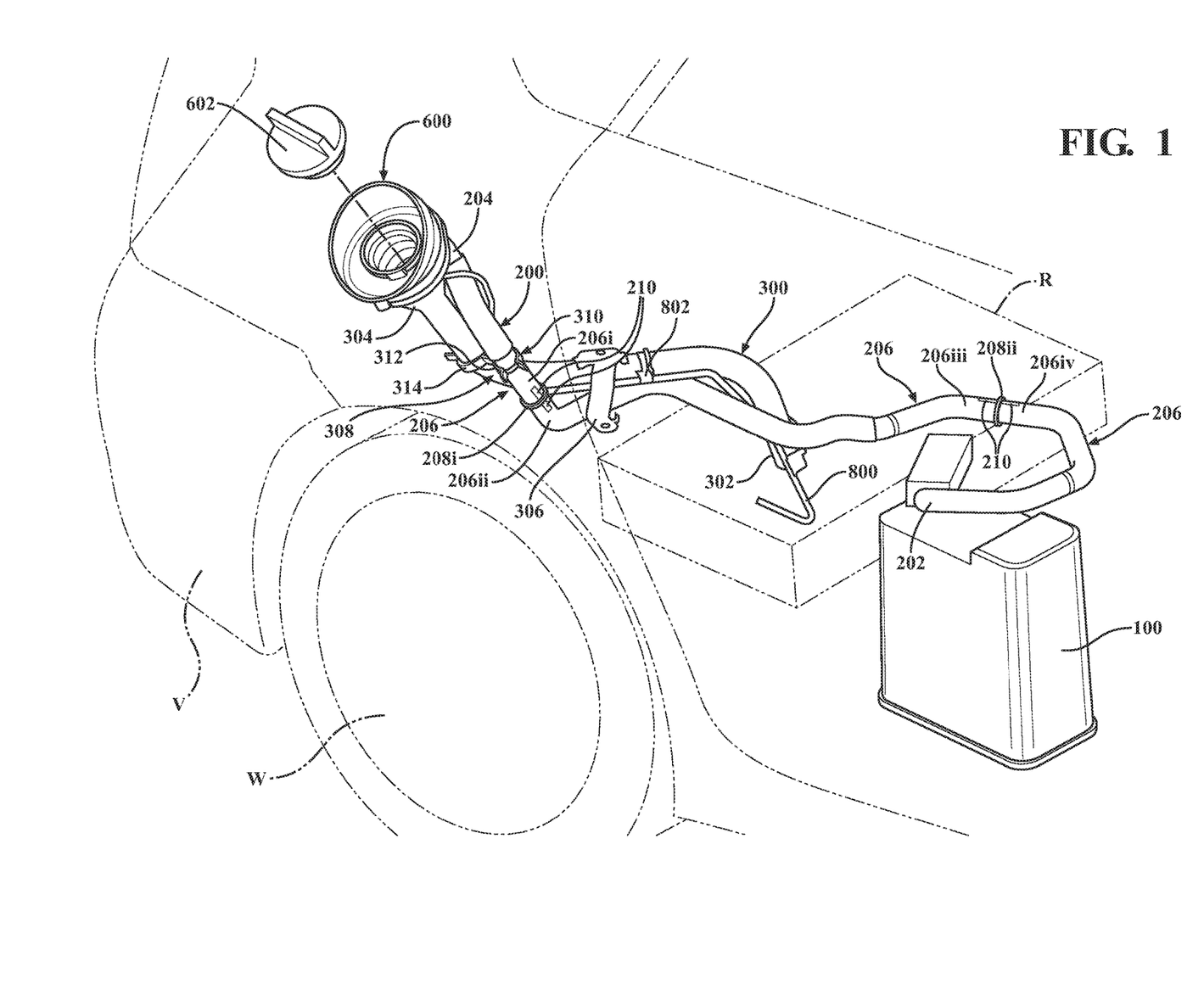
FIG. 1 is a side, perspective view of a fuel filling and vapor recovery system in accordance with one embodiment of the present disclosure, which includes: a canister; a canister box; a (first) canister tube that extends between the canister and the canister box; and a (second) fuel filler tube that extends between the canister box and a fuel receptacle (tank) in the vehicle.

FIGS. 1-4 illustrate one embodiment of a fuel filling and vapor recovery system 1000 that is configured for use with a vehicle V (FIG. 1). The system 1000 facilitates refueling of the vehicle V, as well as the collection and filtration of fuel vapor, and includes: a canister 100; a (first) canister tube 200 (e.g., a hose); a (second) filler tube 300 (e.g., a hose); a canister box 400; and a cap protector 600. In certain embodiments, the system 1000 may also include a guard 700 (FIG. 2) that is configured and oriented to shroud (or otherwise protect) various components of the system 1000 from road debris, tire chains, etc.

The canister 100 is configured and adapted to collect and filter fuel vapor created during refueling and/or operation of the vehicle V, and, as such, may be in communication with (e.g., directly or indirectly connected to) any component of the vehicle V that generates, stores, routes, or otherwise accommodates fuel vapor, such as, for example, the vehicle V's fuel receptacle (tank) R (FIG. 1), the engine (not shown), etc. The canister 100 contains a filtration medium, which may include any material and/or structure suitable for the intended purpose of reducing (or entirely removing) hydrocarbons in the fuel vapor prior to release into the ambient, such as, for example, charcoal, active carbon, etc.

Figure 2:
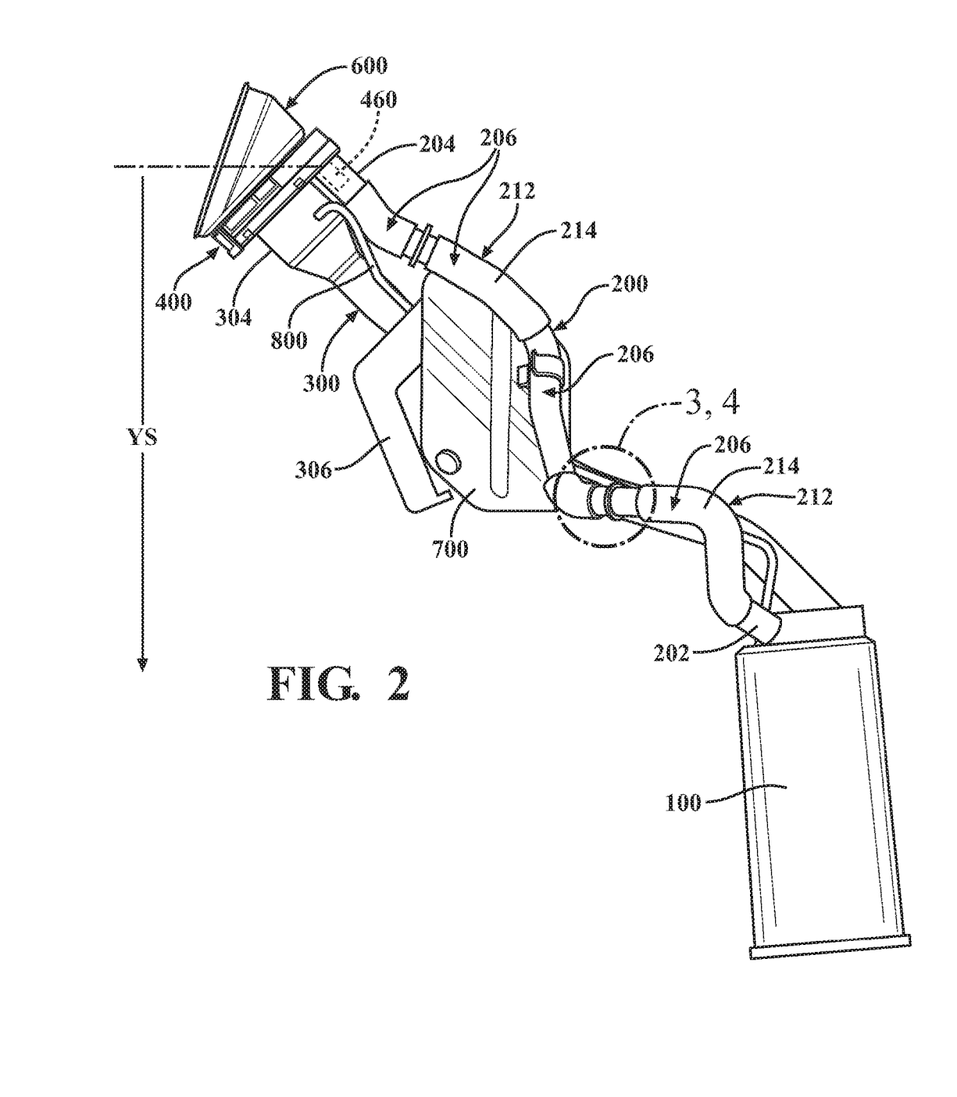
FIG. 2 is a side view of the fuel filling and vapor recovery system seen in FIG. 1.
Figure 3:
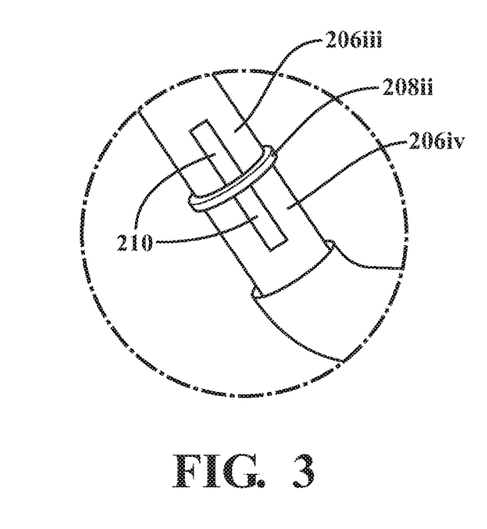
FIG. 3 is an enlargement of the area of detail identified in FIG. 2 illustrating a coupler used to connect adjacent segments of the canister tube.
Figure 4:
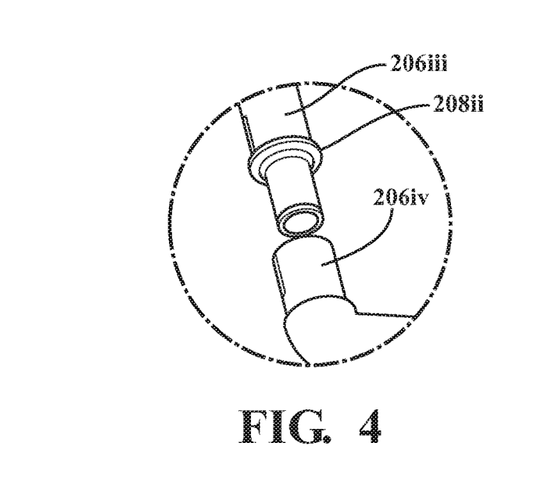
FIG. 4 is an enlargement of the area of detail identified in FIG. 2 showing separation of the coupler from one of the segments of the canister tube.
Figure 5:
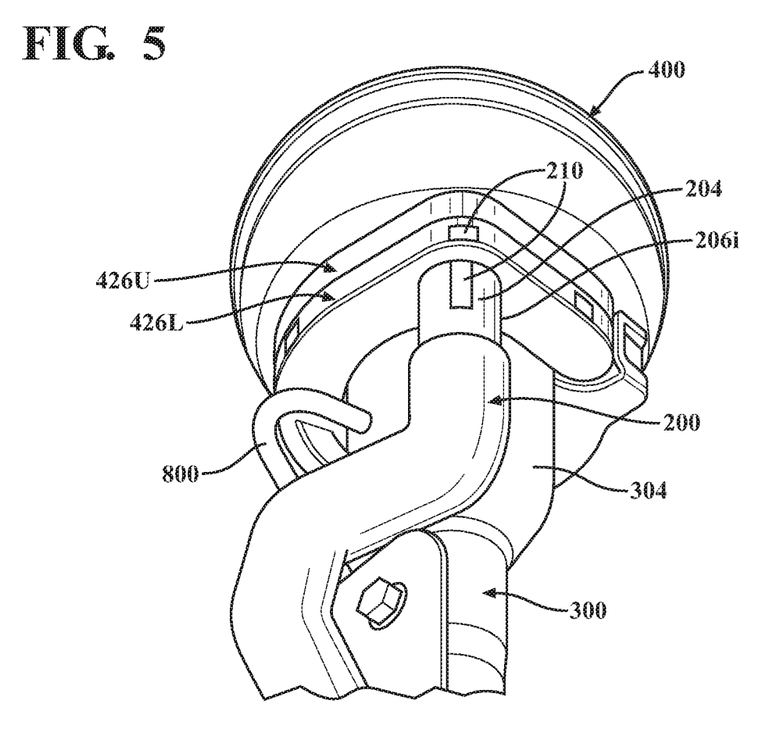
FIG. 5 is a partial, rear view of the canister box illustrating connection to the canister tube.
Figure 6:
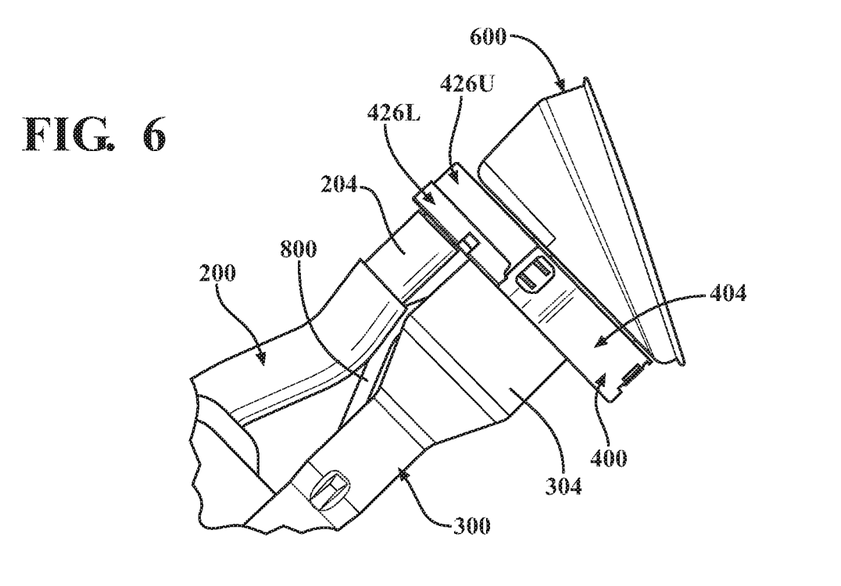
FIG. 6 is a partial, side view of the canister box illustrating connection to the canister tube.

The canister tube 200 connects the canister 100 to the canister box 400 such that, after filtration, the fuel vapor can be safely purged from the vehicle V, and released into the ambient, in the manner described herein. More specifically, the canister tube 200 includes a first end 202 that is configured for connection to the canister 100, and an opposite second end 204 that is configured for connection to the canister box 400. It is envisioned that the canister tube 200 may be unitary in construction, or, alternatively, that the canister tube 200 may include a plurality of individual, discrete segments 206 (FIGS. 1, 2) (e.g., to facilitate assembly, placement, and routing of the canister tube within the vehicle V). For example, in the illustrated embodiment, the canister tube 200 includes (first and second) segments 206i, 206ii that are configured for connection via a (first) coupler 208i, and (third and fourth) segments 206iii, 206iv that are configured for connection via a (second) coupler 208ii. It should be appreciated, however, that, in alternate embodiments, the canister tube 200 may include additional segments 206 and couplers 208 without departing from the scope of the present disclosure. For example, the canister tube 200 may include fifth and sixth segments that are connected by a third coupler, etc. To assist in the assembly of the canister tube 200, as well as to facilitate proper connection of the canister tube 200 to the canister 100 and the canister box 400, and proper orientation of the segments 206i-206iv, in certain embodiments, it is envisioned that the segments 206i-206iv, the canister 100, and the canister box 400 may include corresponding alignment aids 210 (FIGS. 1, 3, 5).

Figure 7:
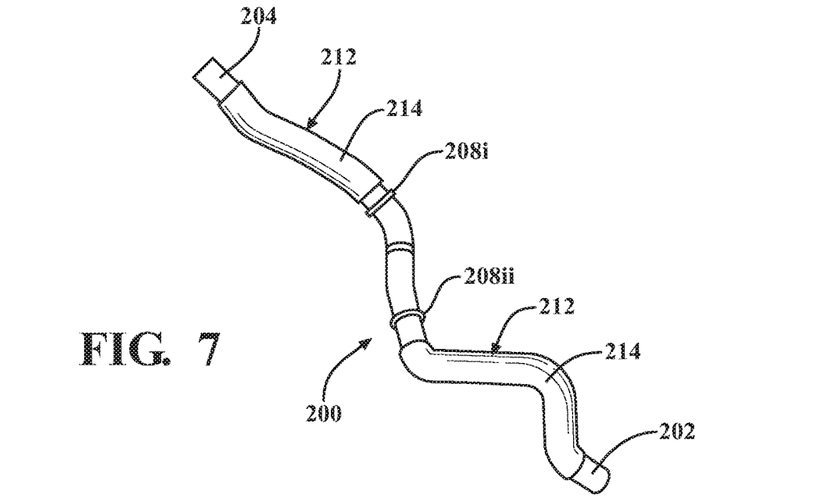
FIG. 7 is a side, perspective view of the canister tube.

In certain embodiments, it is envisioned that the canister tube 200 may include one or more protective members 212 (FIGS. 2, 7) (e.g., sheaths 214), which may extend partially or entirely about the canister tube 200 (and/or the coupler(s) 208). For example, it is envisioned that the protective member(s) 212 may be positioned in locations that may be subject to movement, abrasion, etc., and that the protective member(s) 212 may be configured and constructed accordingly.

With continued reference to FIGS. 1-4, the (fuel) filler tube 300 extends between the canister box 400 and the fuel receptacle R (FIG. 1). More specifically, the filler tube 300 includes a first end 302 that is configured for connection to the fuel receptacle R, and an opposite second end 304 that is configured for connection to the canister box 400 such that the fuel receptacle R is connectable to the canister box 400 via the filler tube 300. In certain embodiments, to reduce movement of the filler tube 300 (e.g., during operation of the vehicle V, during a crash or other such impact, etc.), it is envisioned that the filler tube 300 may be secured to a body of the vehicle V (or any other suitable component or structure) by a support 306 (FIGS. 1, 2), such as a bracket, clip, fastener, etc. In such embodiments, it is envisioned that the support 306 may also be connected to, or otherwise in contact with, the guard 700 (FIG. 2) to support and/or reinforce the guard 700.

The filler tube 300 may include (e.g., may be formed from) any material (or combination of materials) suitable for the intended purpose of communicating fuel into the fuel receptacle R (FIG. 1) during refueling of the vehicle V, and may be positioned in any suitable location. For example, the filler tube 300 may extend from a rear storage area (e.g., a trunk) of the vehicle V, from behind a rear license plate support structure (not shown), from a variety of locations adjacent a front end of the vehicle V, or from any other such suitable site.

In certain embodiments of the disclosure, the system 1000 may include a retention member 308 (FIG. 1) that is configured to restrict (if not entirely prevent) movement between the filler tube 300 and the canister tube 200 (e.g., to reduce contact and/or abrasion). In the illustrated embodiment, for example, the retention member 308 is configured as a clip 310 including a first portion 312 that is configured for engagement with the canister tube 200 (e.g., in snap-fit relation), and a second portion 314 that is configured for engagement with the filler tube 300 (e.g., in snap-fit relation). To facilitate connection of the retention member 308 to the tubes 200, 300, it is envisioned that the portions 312, 314 may be configured and dimensioned in general correspondence with the tubes 200, 300, respectively. For example, in the illustrated embodiment, the portions 312, 314 each include a generally arcuate configuration, although alternate configurations would not be beyond the scope of the present disclosure.

With reference now to FIGS. 5-11 as well, the canister box 400 will be discussed. The canister box 400 is configured for connection to both the canister tube 200 and the filler tube 300 to facilitate refueling of the vehicle V (FIG. 1), and the purging of fuel vapor from the canister 100 in the manner described below. The canister box 400 defines a central longitudinal axis Y (FIGS. 9, 11), and includes respective first and second components 402, 404 (FIGS. 9, 10), each of which is generally arcuate in configuration so as to collectively define an aperture 406 (FIG. 9) that is configured to receive the second end 304 of the filler tube 300. It is envisioned that the components 402, 404 may be formed from any suitable material (or combination of materials), such as, for example, polyoxymethylene or other plastics, polymers, etc., and that the components 402, 404 may include (e.g., may be formed from) the same material (or combination of materials), or dissimilar materials.

In alternate embodiments of the disclosure, it is envisioned that the canister box may be connected to the second end 304 of the filler tube 300 using a variety of methods and/or structures (e.g., depending upon spatial requirements in the vehicle V, etc.). For example, it is envisioned that the second end 304 of the filler tube 300 may be frictionally secured to the canister box 400 (e.g., in an interference fit), or that the filler tube 300 may be compression fit between the components 402, 404. Additionally, or alternatively, it is envisioned that the canister box 400 may be connected to the filler tube 300 via one or more mechanical fasteners (e.g., pins, screws, clips, rivets, etc.), or in any other suitable manner.

Figure 9:
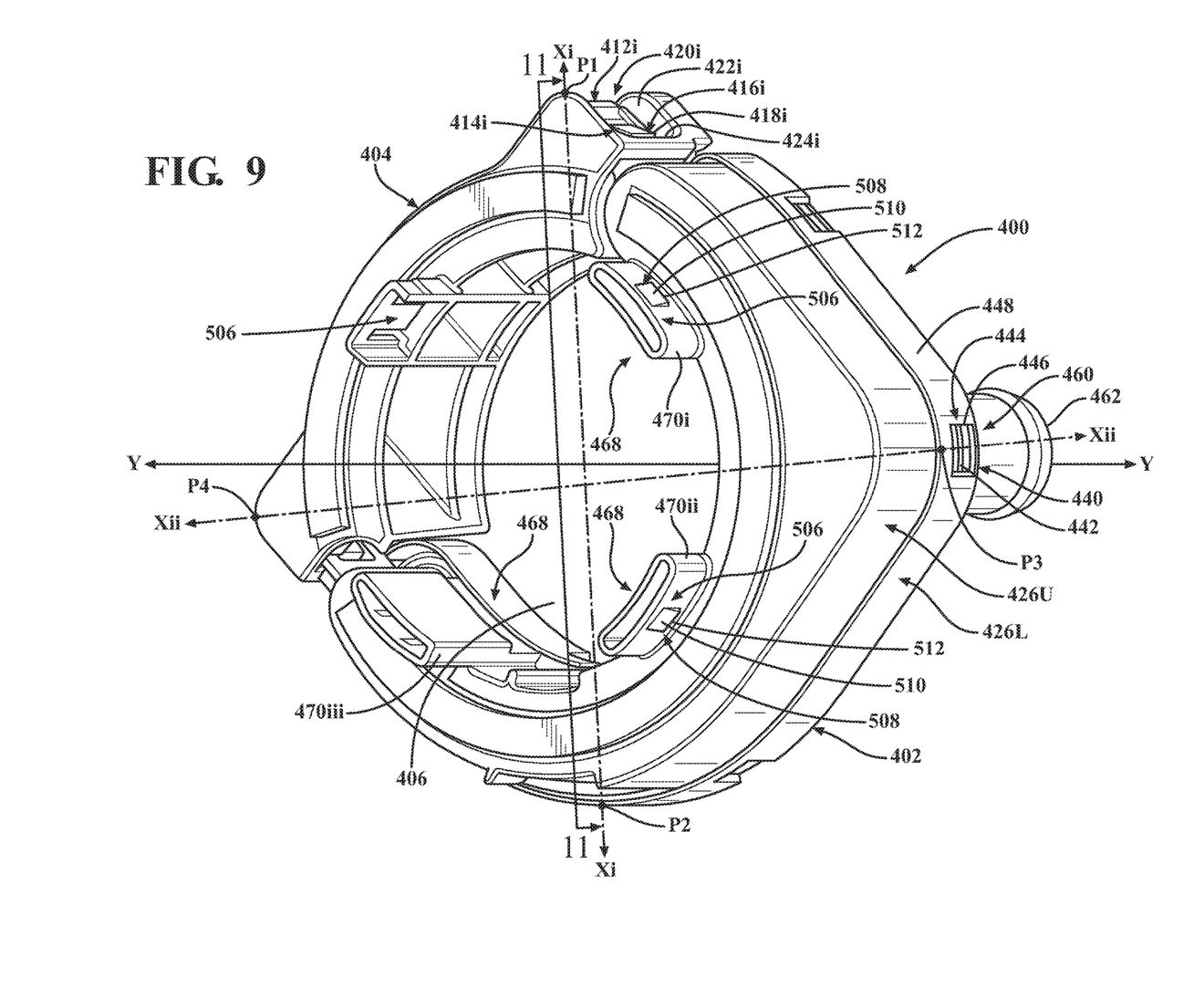
FIG. 9 is a top, perspective view of the canister box.
Figure 10:
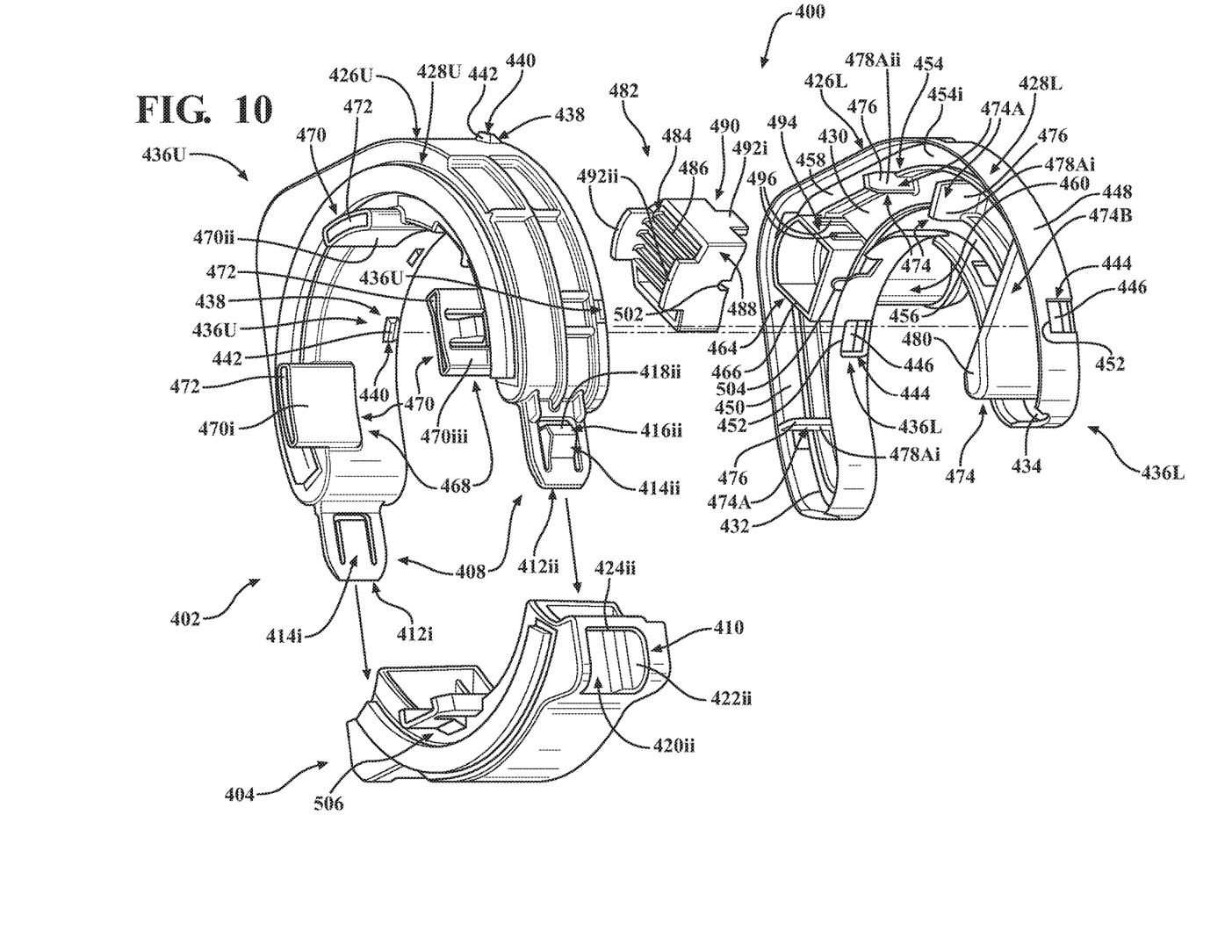
FIG. 10 is a top, perspective view of the canister box shown with parts separated.

The components 402, 404 are configured for releasable connection (e.g., to allow for connection and disconnection of the canister box 400 and the filler tube 300). As seen in FIGS. 9 and 10, for example, the components 402, 404 may include corresponding engagement structures 408, 410, respectively, to mechanically connect the components 402, 404 and facilitate proper alignment thereof. For example, as seen in the illustrated embodiment, the engagement structures 408, 410 may be configured for engagement in snap-fit relation. More specifically, the engagement structure 408 (on the first component 402) includes a (first) finger 412i with a deflectable tab 414i defining a stop 416i (e.g., a shoulder 418i), and a (second) finger 412ii with a deflectable tab 414ii defining a stop 416ii (e.g., a shoulder 418ii), and the engagement structure 410 (on the second component 404) includes a pair of receptacles 420i, 420ii defining recesses 422i, 422ii that are configured to receive the fingers 412i, 412ii, respectively.

To connect the components 402, 404, the finger 412i is inserted into the recess 422i, and the finger 412ii is inserted into the recess 422ii, whereby the tabs 414i, 414ii are deflected inwardly (i.e., towards the central longitudinal axis Y) by end walls 424i, 424ii defined by, respectively, the receptacles 420i, 420ii). To facilitate deflection, the tabs 414i, 414ii may include an angled (e.g., beveled) portion that acts as a bearing surface. The components 402, 404 are continually approximated until the stops 416i, 416ii defined by the tabs 414i, 414ii are advanced beyond the end walls 424i, 424ii, and are positioned within the recesses 422i, 422ii, respectively. Upon positioning of the tabs 414i, 414ii within the recesses 422i, 422ii, the tabs 414i, 414ii return to their normal position (i.e., via a biasing force created during deflection) such that the stops 416i, 416ii (i.e., the shoulders 418*i*, 418*ii*) are positioned adjacent to (e.g., in contact with) the end walls 424*i*, 424*ii* so as to guard against undesired disconnection of the components 402, 404.

To disconnect the component 402 from the component 404, the tabs 414*i*, 414*ii* are deflected inwardly (e.g., via manual manipulation) to allow for withdrawal of the fingers 412*i*, 412*ii* from the receptacles 420*i*, 420*ii*, respectively.

It should be appreciated that, in alternate embodiments of the disclosure, the configurations of the engagement structures 408, 410 may be altered or varied in any suitable manner. For example, an embodiment in which the engagement structures 408, 410 are reversed (i.e., an embodiment in which the component 402 includes the receptacles 420*i*, 420*ii* and the component 404 includes the fingers 412*i*, 412*ii*) is also contemplated herein.

As seen in FIG. 10, the first component 402 of the canister box 400 includes a (first) lower member 426L with a body 428L, and a (second) upper member 426U with a body 428U that is configured for releasable connection to the lower member 426L (e.g., to allow for assembly and disassembly of the first component 402 during cleaning, the repair and/or replacement of components, etc.). In the illustrated embodiment, for example, the lower member 426L includes an arcuate channel 430 with opposing ends 432, 434 that is configured to receive the upper member 426U. It should be appreciated, however, that the specific configuration of the members 426L, 426U and, thus, the channel 430, may be varied in alternate embodiments without departing from the scope of the present disclosure.

To facilitate connection of the lower member 426L and the upper member 426U, the members 426L, 426U may include corresponding engagement structures 436L, 436U, respectively, to mechanically connect the lower member 426L and the upper member 426U, and facilitate proper alignment. For example, as seen in the illustrated embodiment, the engagement structures 436L, 436U may be configured for engagement in snap-fit relation. More specifically, the engagement structure 436U includes a series of fingers 438, each with a deflectable tab 440 defining a stop 442, and the engagement structure 436L includes a series of receptacles 444 (e.g., openings 446) that are formed in a wall 448 of the body 428L, and are configured to receive the fingers 438.

To connect the lower member 426L and the upper member 426U, the fingers 438 are inserted into the openings 446, whereby the tabs 440 are deflected inwardly (i.e., towards the central longitudinal axis Y (FIG. 9)) by an inner surface 450 of the wall 448. To facilitate deflection, the tabs 440 may include an angled (e.g., beveled) portion that acts as a bearing surface. The members 426L, 426U are then approximated until the tabs 440 are positioned within the openings 446, at which time the tabs 440 are returned to their normal position (i.e., via a biasing force created during deflection) such that the stops 442 are positioned adjacent to (e.g., in contact with) upper walls 452 defined by the openings 446 so as to guard against undesired disconnection of the upper member 426U and the lower member 426L.

To disconnect the lower member 426L from the upper member 426U, the tabs 440 are deflected inwardly (e.g., via manual manipulation) to allow for withdrawal of the fingers 438 from the receptacles 444.

It should be appreciated that, in alternate embodiments of the disclosure, the configurations of the engagement structures 436L, 436U may be altered or varied in any suitable manner. For example, an embodiment in which the engagement structures 436U, 436L are reversed (i.e., an embodiment in which the upper member 426U includes the receptacles 444 and the lower member 426L includes the fingers 438) is also contemplated herein.

The lower member 426L and the upper member 426U are configured and dimensioned such that, upon connection, a watertight seal is formed therebetween to inhibit (if not entirely prevent) external water intrusion into the canister box 400 (e.g., from tire splash, flood conditions, etc.) and, thus, the canister tube 200 and the canister 100. For example, in certain embodiments, it is envisioned that the lower member 426L and the upper member 426U may be manufactured (e.g., via machining, casting, 3-D printing, molding, etc.) within tolerances that facilitate the mechanical formation of a watertight seal between the members 426L, 426U upon connection. Additionally, or alternatively, the canister box 400 may include one or more sealing members 454. As seen in FIG. 10, the canister box 400 may include a (first) sealing member 454*i* that is positioned between the lower member 426L and the upper member 426U so as to facilitate the formation of a (first) watertight seal. For example, it is envisioned that, upon connection of the members 426L, 426U, the sealing member 454*i* may be compressed (or otherwise deformed) so as to fill any gaps (or other such openings) between the members 426L, 426U through which water may otherwise enter the canister box 400.

The sealing member(s) 454 may include (e.g., may be formed from) any suitable material (or combination of materials), such as, for example, rubbers (e.g., nitrile rubber, ethylene propylene diene terpolymer, etc.), polymeric materials, foam, etc. Although the sealing member 454*i* is illustrated as approximating the arcuate configuration of the channel 430 in a continuous manner (i.e., so as to define an inner sealing portion 456 and an outer sealing portion 458), in alternate embodiments, the sealing member 454 may be discontinuous in configuration such that the respective inner and outer sealing portions 456, 458 are formed as discrete (disconnected) structures.

Figure 11:
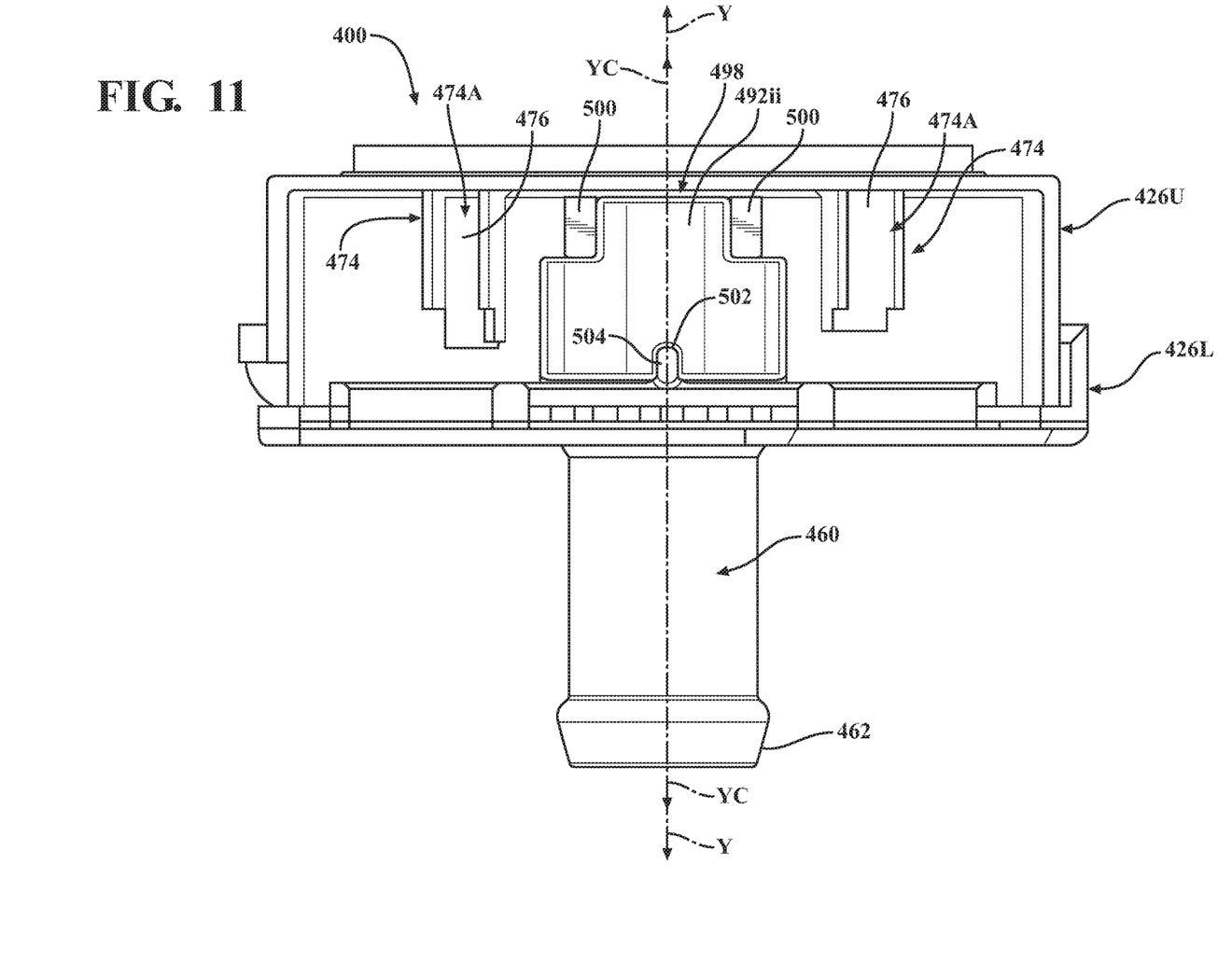
FIG. 11 is a cross-sectional view of the canister box taken through line 11-11 in FIG. 9.

To facilitate connection of the canister box 400 to the canister tube 200, the canister box 400 includes a connector 460 that extends outwardly from (and through) the body 428L of the lower member 426L. The connector 460 is integrally (e.g., monolithically) formed with the body 428L of the lower member 426L so as to eliminate any spacing, openings, gaps, etc., between the body 428L and the connector 460. As seen in FIG. 11, for example, the connector 460 is generally linear in configuration (i.e., the connector 460 is devoid of any elbows, or other such bends or turns), and defines a longitudinal axis YC that extends in generally parallel relation to the central longitudinal axis Y defined by the canister box 400.

The connector 460 includes opposing open (first and second) ends 462, 464, respectively. The first end 462 of the connector 460 is configured for receipt by the second end 204 of the canister tube 200. In certain embodiments, the first end 462 may include one or more surface irregularities (e.g., ribs, projections, detents), tapers, etc., to vary the surface configuration of the first end 462 and increase friction between the connector 460 and the canister tube 200, thereby encouraging secured engagement of the canister box 400 and the canister tube 200. The second end 464 of the connector 460 includes a hub 466 (FIG. 10) that is positioned between the bodies 428L, 428U of the members 426L, 426U, respectively, upon assembly of the canister box 400 such that fuel vapor is communicable from the canister tube 200 into the canister box 400 during purging, as described in further detail below.

As seen in FIG. 9, the canister box 400 defines a first axis Xi that extends between outermost lateral points P1, P2, and a second axis Xii that extends between uppermost and lowermost longitudinal points P3, P4, respectively, such that the second axis Xii is generally orthogonal in relation to the first axis Xi. The connector 460 is positioned generally adjacent to the uppermost longitudinal point P3 on the canister box 400, which constitutes a point of maximum elevation on the canister box 400, so as to increase (e.g., maximize) the vertical separation YS (distance) (FIG. 2) between the connector 460 and wheels W of the vehicle V, the ground, etc. By increasing the vertical separation YS, tire splash from the wheels W can be reduced during operation of the vehicle V, and, thus, external water intrusion into the canister box 400, the canister tube 200, and the canister 100. Similarly, during use of the vehicle V in wet environments (e.g., during flood conditions), the increased vertical separation YS creates additional space between the connector 460 and any environmental water, thereby further reducing the likelihood of water intrusion into the canister box 400, the canister tube 200, and the canister 100.

To facilitate communication of the filtered fuel vapor through the canister box 400, the canister box 400 includes one or more vents 468 (FIGS. 8, 9), which constitute the only point(s) of entry into, and exit from, the canister box 400. In the illustrated embodiment, the vents 468 are configured as a series of chimneys 470$i$-470$iii$ defining channels 472$i$-472$iii$, respectively, that extend vertically from the components 402 such that the chimneys 470$i$-470$iii$ are spaced approximately equidistant from each other (e.g., separated by approximately 90°). It should be appreciated, however, that the particular configuration, number, and/or location of the vents 468 may be varied in alternate embodiments without departing from the scope of the present disclosure.

Although shown as being integrally formed with the component 402 in the embodiment of the canister box 400 shown throughout the figures, in alternate embodiments, it is envisioned that the vents 468 may be formed as discrete structures that are connected to the component 402, such as, for example, the use of mechanical fasteners (e.g., pins, screws, clips, rivets, etc.), adhesives, ultrasonic welding, etc.

In certain embodiments, the canister box 400 may include one or more internal baffles 474 that are configured and positioned to interrupt the flow of filtered fuel vapor through the canister box 400 so as to regulate pressure, and control the release of the filtered fuel vapor to the ambient. In the embodiment seen in FIGS. 10 and 11, for example, the canister box 400 includes baffles 474 that extend (downwardly) from the upper member 426U towards the lower member 426L, and baffles 474 that extend (upwardly) from the lower member 426L towards the upper member 426U. Depending upon the particular configuration and dimensions of the baffles 474, it is envisioned that the baffles 474 may be aligned with one another, or that the baffles 474 may be offset so as not to interfere with assembly of the canister box 400. Additionally, although shown and described in connection with the first component 402, it should be appreciated that the second component 404 may include a similar (identical) arrangement of baffles 474 in various embodiments of the disclosure.

The baffles 474 may be identical in configuration, or, alternatively, the configurations of the baffles 474 may vary. For example, as seen in FIGS. 10 and 11, the canister box 400 may include one or more first baffles 474A that are configured as upstanding plates 476, and one or more second baffles 474B that include a generally wedge-shaped configuration. In the particular embodiment seen in FIGS. 10 and 11, the baffles 474A include baffle members 478A$i$ that are oriented such that the width of each baffle member 478A$i$ extends in generally orthogonal relation to the arcuate channel 430, and baffle members 478A$ii$ that are oriented such that the width of each baffle member 478A$ii$ extends at an angle to the arcuate channel 430. In alternate embodiments of the disclosure, however, it is envisioned that the particular number, location, configuration, and/or orientation of the baffles 474 (e.g., the baffle members 478A, 478B) may be varied to achieve any desired result (e.g., compliance with regulations or industry standards pertaining to the release of fuel vapor).

The second baffle 474B includes a tapered configuration that increases in height towards the end 434 of the arcuate channel 430. In the illustrated embodiment, the second baffle 474B defines a generally planar platform 480 that is located generally adjacent to the end 434 of the arcuate channel 430. In such embodiments, it is envisioned that the second baffle 474B may support the upper member 426U (e.g., so as to provide structural rigidity along the longitudinal axis Y), and/or that the second baffle 474B may inhibit (if not entirely prevent) water accumulation inside the canister box 400.

With continued reference to FIGS. 10 and 11, in certain embodiments, the canister box 400 may further include a filter 482 that is configured for positioning between the members 426L, 426U of the first component 402. More specifically, the filter 482 is configured for positioning adjacent to (e.g., in contact with) the hub 466 included at the second end 464 of the connector 460 to inhibit (if not entirely prevent) foreign matter (e.g., insects, debris, etc.) from entering the canister tube 200 and, thus, the canister 100, through the canister box 400. The filter 482 includes a mesh 484 defining a series of openings 486 that are configured so as not to materially obstruct the flow of filtered fuel vapor through the canister box 400. It is envisioned that the filter 482 may include (e.g., may be formed from) any suitable material (or combination of materials), such as, for example, polyoxymethylene or other plastics, polymers, etc., and that the material(s) from which the filter 482 is formed may be identical to, or dissimilar from, the material(s) used to form the member 426L and/or the member 426U.

In the illustrated embodiment, the filter 482 includes a body 488 that is configured in correspondence with the second end 464 of the connector 460 (e.g., with the hub 466) to facilitate proper orientation of the filter 482, and connection of the filter 482 to the connector 460. While the body 488 of the filter 482 and the hub 466 are each shown as including three linear sides and one arcuate side (e.g., to inhibit relative movement between the filter 482 and the connector 460) in the particular embodiment shown in the figures, it should be understood that the geometric configuration of the filter 482 and the second end 464 of the connector 460 may be varied in alternate embodiments of the disclosure. For example, embodiments in which the body 488 of the filter 482 and the second end 464 of the connector 460 are generally polygonal (e.g., square or rectangular), or more rounded, in configuration would not be beyond the scope of the present disclosure.

In certain embodiments, the filter 482 may include one or more struts 490 (or other such members) to further facilitate secured positioning, and proper orientation, of the filter 482 within the canister box 400. In the illustrated embodiment, for example, the filter 482 includes a first pair of legs 492$i$ (FIG. 10) that extend vertically downward for positioning within corresponding receiving spaces 494 defined by ribs 496 (or other such members) included on the hub 466 of the connector 460, and a second pair of legs 492*ii* (FIG. 11) that extend vertically upward for positioning within corresponding receiving spaces 498 defined by ribs 500 (or other such members) included on the upper member 426U. As seen in FIGS. 10 and 11, the filter 482 may also include one or more notches 502 that are configured to receive one or more corresponding projection(s) 504 that extend outwardly from the hub 466 to further secure the filter 482 in relation to the connector 460, and facilitate proper orientation.

Figure 8:
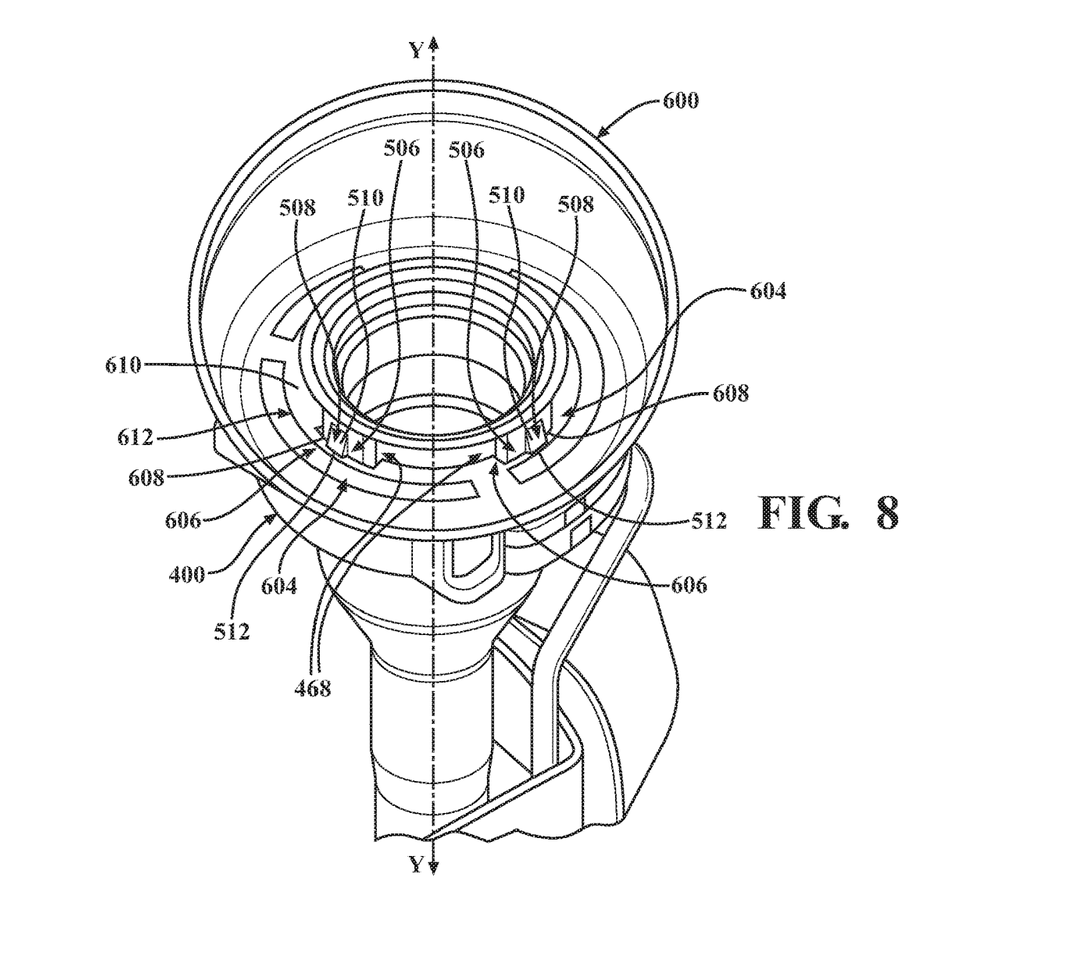
FIG. 8 is a partial, front view of the canister box shown connected to a cap protector.

With reference now to FIGS. 8 and 9, the cap protector 600 is configured to receive and shield a removable fuel filler cap 602 (FIG. 1) that closes off and seals the second end 304 of the filler tube 300. The cap protector 600 is configured for releasable connection to the canister box 400 via engagement structures 604, 506 that are respectively included on the cap protector 600 and the canister box 400. The engagement structures 604, 506 facilitate mechanical connection and disconnection of the cap protector 600 and the canister box 400, and facilitate proper alignment of the structures. In the illustrated embodiment, for example, the engagement structures 604, 506 are configured for engagement in snap-fit relation. More specifically, the engagement structure 506 includes a series of fingers 508, each with a deflectable tab 510 defining a stop 512, and the engagement structure 604 includes a series of receptacles 606 (e.g., openings 608) that are configured to receive the fingers 508. In the illustrated embodiment, the fingers 508 are positioned on the chimneys 470*i*-470*iii* included on the component 402, and the openings 608 are formed in a wall 610 defining an inner collar 612 of the cap protector 600. The receptacles 606 are, thus, spaced approximately equidistant from each other (e.g., separated by approximately 90°) so as to facilitate receipt of the fingers 508 on the chimneys 470*i*-470*iii*. It should be appreciated, however, that the particular configurations and/or locations of the engagement structures 604, 506 may be varied in alternate embodiments of the disclosure.

Although described in connection with the first component 402, it should be appreciated that the engagement structure 506 may also be provided on the second component 404, as seen in FIGS. 9 and 10, to facilitate connection of the cap protector 600 to the second component 404.

To connect the cap protector 600 and the canister box 400, the fingers 508 are inserted into the receptacles 606, whereby the tabs 510 are deflected inwardly (i.e., towards the central longitudinal axis Y (FIG. 9)) by an inner surface of the wall 610. To facilitate deflection, the tabs 510 may include an angled (e.g., beveled) portion that acts as a bearing surface. The cap protector 600 and the canister box 400 are then press-fit together until the tabs 510 are positioned within the receptacles 606, at which time the tabs 510 are returned to their normal position (i.e., via a biasing force created during deflection) such that the stops 512 are positioned adjacent to (e.g., in contact with) an upper, outer surface of the wall 610 so as to guard against undesired disconnection of the cap protector 600 and the canister box 400.

To disconnect the cap protector 600 from the canister box 400, the tabs 510 are deflected inwardly (e.g., via manual manipulation) to allow for withdrawal of the fingers 508 from the receptacles 606.

It should be appreciated that, in alternate embodiments of the disclosure, the configurations of the engagement structures 604, 506 may be altered or varied in any suitable manner. For example, an embodiment in which the engagement structures 604, 506 are reversed (i.e., an embodiment in which the chimneys 470*i*-470*iii* include the receptacles 606 and the cap protector 600 includes the fingers 508) is also contemplated herein.

It is envisioned that the cap protector 600 and the canister box 400 may be configured and dimensioned such that, upon connection, a watertight seal is formed therebetween to inhibit (if not entirely prevent) external water intrusion into the canister box 400, the canister tube 200, and the canister 100 (e.g., from tire splash, or during operation of the vehicle V (FIG. 1) in wet or flooded areas). For example, in certain embodiments, it is envisioned that the cap protector 600 and the canister box 400 may be manufactured (e.g., via machining, casting, 3-D printing, molding, etc.) within tolerances that facilitate the mechanical formation of a watertight seal therebetween upon connection. Additionally, or alternatively, one or more of the aforementioned sealing members 454 may be positioned between the cap protector 600 and the canister box 400. As seen in FIG. 10, for example, a (second) sealing member 454*ii* may be positioned between the cap protector 600 and the canister box 400 so as to facilitate the formation of a (second) watertight seal. As discussed above, the sealing member 454*ii* may include (e.g., may be formed from) any suitable material (or combination of materials), such as, for example, rubbers (e.g., nitrile rubber, ethylene propylene diene terpolymer, etc.), polymeric materials, foam, etc. Upon connection of the cap protector 600 and the canister box 400, it is envisioned that the sealing member 454*ii* may be compressed (or otherwise deformed) so as to fill any gaps (or other such openings) between the cap protector 600 and the canister box 400 through which water may otherwise enter the canister box 400.

With reference now to FIGS. 1-11, general operation of the system 1000 will be described. Prior to refueling, the fuel filler cap 602 (FIG. 1) is removed, and a fuel nozzle (not shown) is inserted into the filler tube 300 through the cap protector 600. During refueling, as the receptacle R (FIG. 1) is filled, fuel vapor is recirculated via a recirculation conduit 800 that extends between the receptacle R and the second end 304 of the filler tube 300. To reduce movement of the recirculation conduit 800 (e.g., during operation of the vehicle V, during a crash or other such impact, etc.), it is envisioned that the recirculation conduit 800 may be secured to the filler tube 300 (or any other suitable component or structure) by a bracket 802, a clip, a fastener, or any other such suitable structure.

During refueling and/or engine operation, fuel vapor fills the canister 100, and is filtered by the filtration medium contained therein prior to purging through the canister box 400. More specifically, the filtered fuel vapor travels (upwardly) through the canister tube 200 to the canister box 400, and enters the canister box 400 through the connector 460 (FIG. 2). Due to the linear configuration of the connector 460, and the absence of any elbows, bends, etc., the filtered fuel vapor is allowed to flow from the canister tube 200 into the canister box 400, through the connector 460, along a linear path.

Upon entering the canister box 400, as the filtered fuel vapor migrates towards the chimneys 470, the filtered fuel vapor flows along a tortuous path defined by the configuration of the canister box 400 itself, and the configuration and location of the baffles 474 (FIGS. 10, 11). The baffles 474 interrupt the flow of filtered fuel vapor through the canister box 400, and thereby regulate the rate at which the filtered fuel vapor is released into the ambient. By varying the number, configuration, and/or positions of the baffles 474, any desired flow rate through the canister box 400 can be achieved. Upon reaching the chimneys 470, the filtered fuel vapor is communicated externally of the canister box 400, through the channels 472, and into the ambient through the cap protector 600.

As mentioned above, due to the increased vertical separation YS (FIG. 2) (e.g., height) of the connector 460 in the vehicle V (FIG. 1) realized by positioning the connector 460 generally adjacent to the point of maximum elevation on the canister box 400 (i.e., the uppermost longitudinal point P3 (FIG. 9)), the vertical distance between the connector and the wheels W (FIG. 1) of the vehicle V, as well as any environmental water, such as that which may be present during flood conditions, is increased. This increased vertical position reduces (if not entirely eliminates) the likelihood of water intrusion into the canister box 400 and, thus, the canister tube 200 and the canister 100. This likelihood is further reduced via inclusion of the sealing member 454$i$ located between the respective upper and lower members 426U, 426L of the canister box 400, and the sealing member 454$ii$ located between the cap protector 600 and the canister box 400.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A fuel filling and vapor recovery system for a vehicle, comprising:
   a canister in communication with a fuel receptacle in the vehicle to collect and filter fuel vapor from the fuel receptacle;
   a first tube including a first end connected to the canister, and a second end opposite the first end;
   a second tube including a first end connected to the fuel receptacle, and a second end opposite the first end; and
   a canister box configured for connection to the second ends of the first and second tubes, the canister box comprising:
   an upper member; and
   a lower member configured for engagement with the upper member such that a watertight seal is formed therebetween to prevent external water intrusion into the canister box, the lower member including an integral connector configured for connection to the first tube to allow the fuel vapor to enter the canister box, the upper member and the lower member being configured for releasable connection to facilitate selective disassembly and reassembly of the upper member and the lower member.

2. The fuel filling and vapor recovery system of claim 1, wherein the lower member defines an arcuate channel configured to receive the upper member.

3. The fuel filling and vapor recovery system of claim 1, wherein the canister box further includes a filter positioned between the upper member and the lower member, the filter being positioned adjacent to the connector to inhibit foreign items from entering the first tube and/or the canister through the canister box.

4. The fuel filling and vapor recovery system of claim 1, wherein the canister box defines a first axis extending between outermost lateral points on the canister box, and a second axis extending between uppermost and lowermost longitudinal points on the canister box, the second axis being generally orthogonal in relation to the first axis, the connector being positioned generally adjacent to the uppermost longitudinal point on the canister box to increase vertical separation between the connector and wheels of the vehicle.

5. The fuel filling and vapor recovery system of claim 4, wherein the connector is generally linear in configuration such that the fuel vapor is flowable from the first tube into the canister box along a linear path.

6. The fuel filling and vapor recovery system of claim 1, wherein the upper member and the lower member include corresponding engagement structures to mechanically connect the upper member to the lower member.

7. The fuel filling and vapor recovery system of claim 6, wherein the corresponding engagement structures on the upper member and the lower member are configured for engagement in snap-fit relation.

8. The fuel filling and vapor recovery system of claim 6, wherein the canister box further includes a first sealing member positioned between the upper member and the lower member such that a first watertight seal is formed upon connection of the upper member and the lower member.

9. The fuel filling and vapor recovery system of claim 8, further including a cap protector configured for connection to the canister box, wherein the canister box includes at least one chimney configured to channel the fuel vapor externally, the cap protector and the at least one chimney including corresponding engagement structures to mechanically connect the cap protector to the canister box.

10. The fuel filling and vapor recovery system of claim 9, further including a second sealing member positioned between the upper member and the cap protector such that a second watertight seal is formed upon connection of the cap protector and the upper member.

11. A canister box connectable to a canister in a vehicle via a canister tube to release fuel vapor after filtration by the canister, the canister box comprising:
a first component including:
a lower member including an integral connector configured for connection to the canister tube to allow the fuel vapor to enter the canister box; and
an upper member configured for engagement with the lower member such that a watertight seal is formed therebetween to prevent external water intrusion into the canister box, the lower member and the upper member including corresponding engagement structures configured for mechanical connection to secure together the lower member and the upper member, the upper member and the lower member being configured for releasable connection via movement along a first axis to facilitate selective disassembly and reassembly of the first component;
a second component configured for engagement with the first component via movement along a second axis transverse in relation to the first axis; and
at least one sealing member positioned between the lower member and the upper member to facilitate formation of the watertight seal.

12. The canister box of claim 11, further including a filter positioned between the lower member and the upper member, the filter being positioned adjacent to the connector to inhibit matter from entering the canister tube through the canister box.

13. The canister box of claim 11, wherein the canister box defines a first axis extending between outermost lateral points on the canister box, and a second axis extending between uppermost and lowermost longitudinal points on the canister box, the connector being positioned generally adjacent to the uppermost longitudinal point on the canister box.

14. The canister box of claim 11, wherein the canister box includes at least one chimney configured to channel the fuel vapor externally.

15. The canister box of claim 14, wherein the canister box is configured for connection to a cap protector, the cap protector and the at least one chimney including corresponding engagement structures to mechanically connect the cap protector to the upper member.

16. The canister box of claim 15, further including at least one sealing member positioned between the upper member and the cap protector to facilitate formation of a watertight seal between the cap protector and the upper member upon connection of the cap protector and the upper member.

17. A method of assembling a fuel filling and vapor recovery system in a vehicle, the method comprising:
assembling a first component of a canister box by connecting an upper member to a lower member;
connecting a second component of the canister box to the first component such that a fuel filler tube in communication with a fuel receptacle in the vehicle is positioned between the first component and the second component;
orienting the canister box such that an integral connector extending outwardly from the canister box is positioned adjacent a point of maximum elevation to increase vertical separation between the connector and wheels of the vehicle; and
connecting the canister box to a canister tube in communication with a canister in the vehicle such that fuel vapor is communicated into the canister box via the canister tube after filtration by the canister.

18. The method of claim 17, further comprising assembling the canister box, wherein assembling the canister box includes connecting upper and lower members such that a watertight seal is formed therebetween to prevent external water intrusion into the canister box.

19. The method of claim 18, wherein connecting the upper and lower members includes compressing at least one sealing member positioned between the upper and lower members to facilitate formation of the watertight seal.

20. The method of claim 19, wherein assembling the canister box further includes positioning a filter between the upper and lower members and adjacent to the connector to inhibit matter from entering the canister tube through the canister box.

* * * * *